Dec. 22, 1931.  A. F. MASURY  1,837,874
INDIVIDUALLY SPRUNG DRIVING AND STEERING WHEEL
Filed April 28, 1931   4 Sheets-Sheet 1
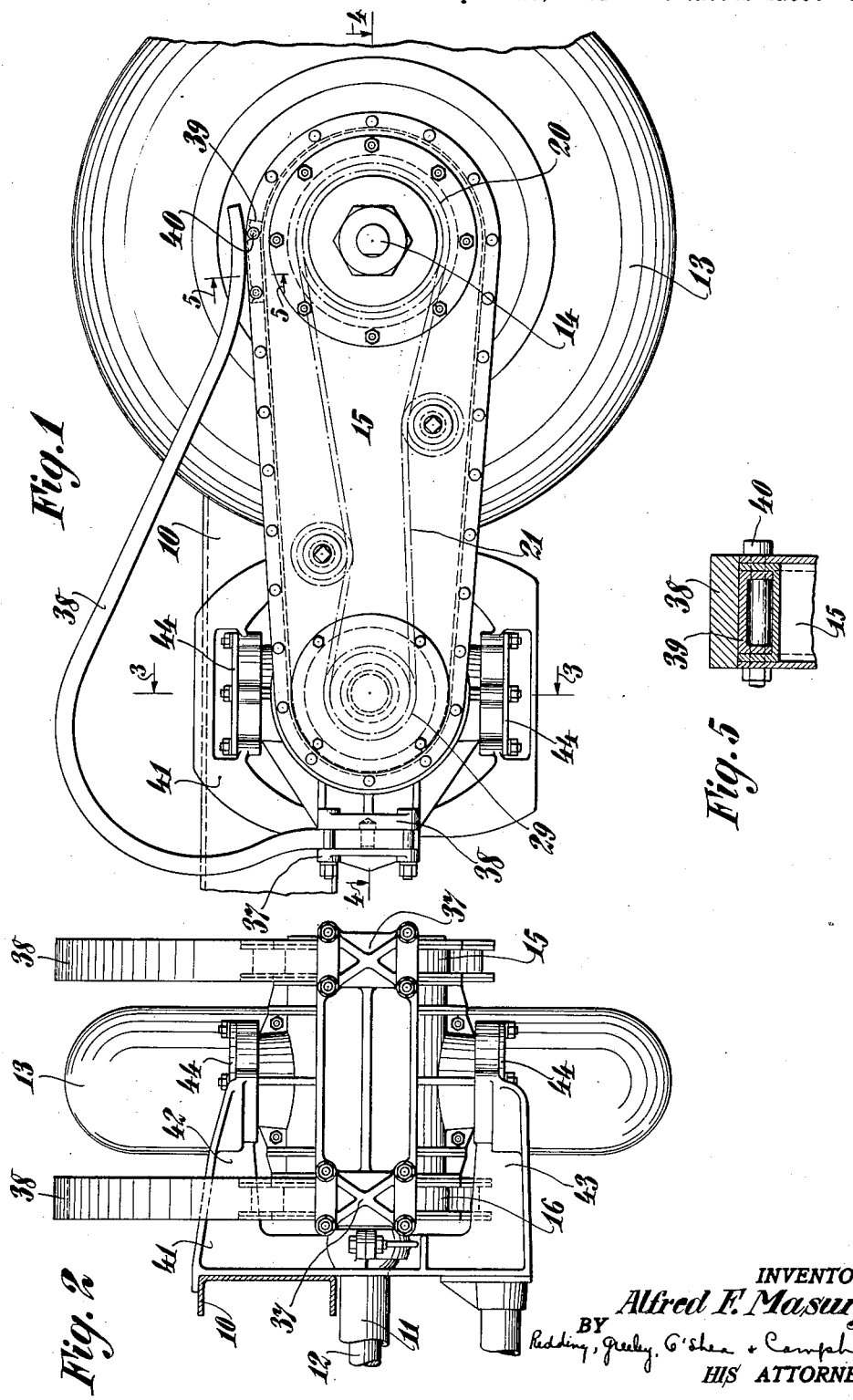

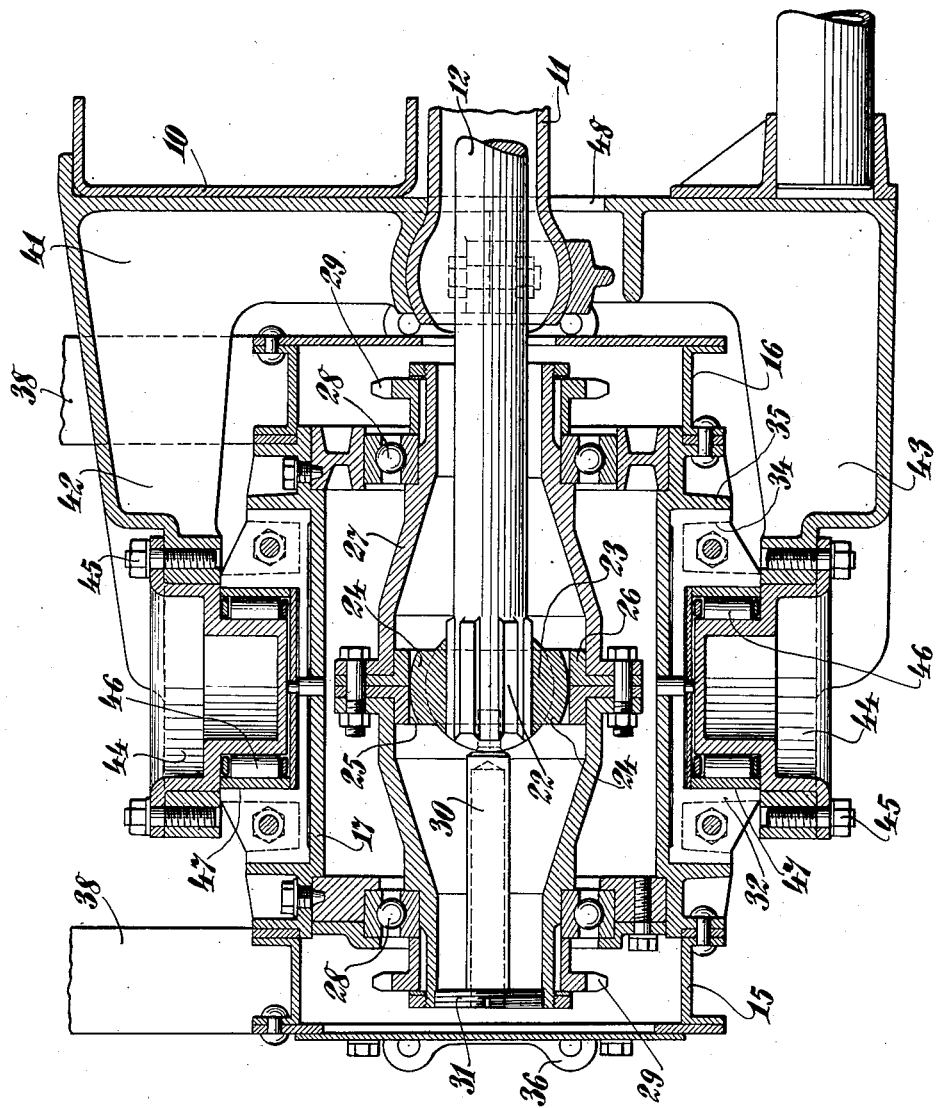

Patented Dec. 22, 1931

1,837,874

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

INDIVIDUALLY SPRUNG DRIVING AND STEERING WHEEL

Application filed April 28, 1931. Serial No. 533,437.

The present invention relates to individually sprung drive wheels for motor vehicles and embodies, more specifically, an improved drive wheel of the above character which is capable of steering movements and which is provided with an improved driving mechanism receiving power from a prime mover carried by the vehicle chassis.

The specific construction described herein and embodying the present invention, as well as numerous modifications thereof greatly facilitates the construction of driving and steering mechanisms for individually sprung wheels. Considerable attention has been directed to the constructions affording a suitable driving mechanism for wheels of this character and an object of the present invention is to provide an individually sprung wheel having an improved driving mechanism for transmitting the driving torque thereto.

A further object of the invention is to provide, in a wheel of the above character, a mounting whereby the wheel may be conveniently steered.

A further object of the invention is to incorporate, in an individually sprung driving and steering wheel, an improved spring mounting for the mechanism whereby the vehicle chassis may be effectively sprung upon the driving and steering wheels.

Further objects, not specifically enumerated above, will be apparent as the invention is described in greater detail in connection with the accompanying drawings, wherein:

Figure 1 is a view in side elevation, showing an individual wheel mounted in accordance with the present invention.

Figure 2 is a view in front elevation, showing the wheel mounting of Figure 1.

Figure 3 is a view in section, taken on line 3—3 of Figure 1, and looking in the direction of the arrows.

Figure 5 is a view in section, taken on line 5—5 of Figure 1, and looking in the direction of the arrows.

Figure 4:
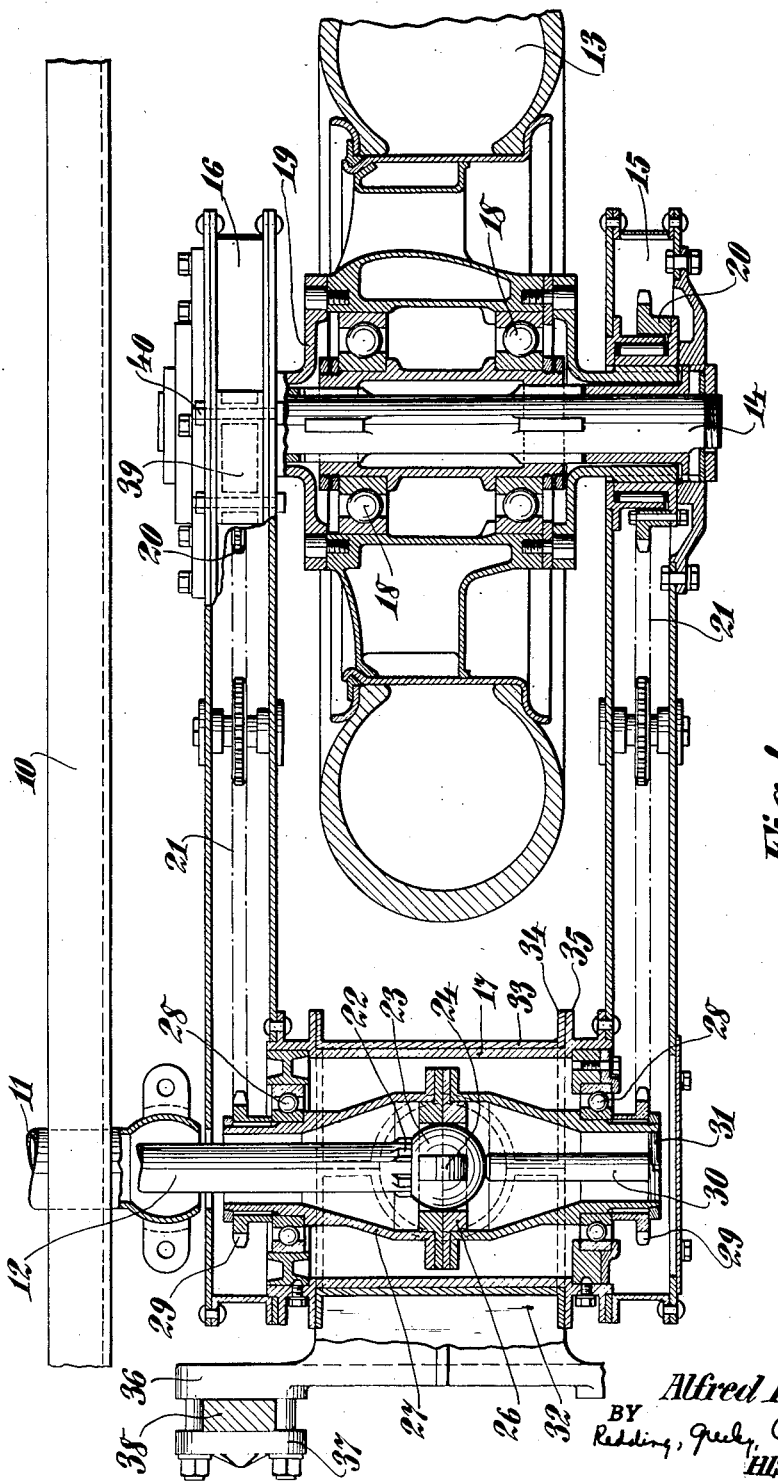
Figure 4 is a view in section, taken on line 4—4 of Figure 1, and looking in the direction of the arrows.

With reference to Figures 1, 2, 3, 4, and 5 a vehicle side frame member is shown at 10 and carries an axle housing 11 within which a jack shaft 12 is mounted. This jack shaft drives a wheel 13 which is mounted upon an axle 14 which is journaled between the bifurcations 15 and 16 of a bifurcated housing 17. Bearings 18 journal the wheel upon the axle 14 and driving sleeves 19, which are secured to the hub of the wheel at either side thereof, mount sprockets 20 which are driven by means of chains 21 (indicated in dot and dash lines).

Jack shaft 12 is formed with a splined extremity 22 upon which a ball 23 is mounted slidably, the ball being formed with diametrically opposed keys 24 which are adapted to engage cooperating grooves 25 formed in a ring 26 which is carried by a sleeve 27. The sleeve 27 is journaled in bearings 28 and carries driving sprockets 29 which drive the chains 21.

The position of the ball 23 is adjusted by means of an arm 30 which is formed with an enlarged head 31 which is threaded to engage one extremity of the sleeve 27 and thus the shaft is centered properly within the ball 23. To facilitate the assembly of these elements, the ring 26 and sleeve 27 are formed in two parts and suitably secured together within the housing 17.

The housing 17 is formed cylindrically and thus affords a bearing surface which provides for movement of the bifurcations 15 and 16 in vertical planes. The cylindrical bearing surface formed by the housing 17 is received within a ring 32 which is formed with a split journal member 33 having flanges 34. Flanges 34 cooperate with flanges 35 formed on the housing 17 to center the housing properly as will be clearly seen in Figure 4.

Upon opposite sides of the ring 32 are formed extensions 36 with which clamping plates 37 cooperate to secure springs 38 in position. These springs are suitably formed to engage spring bearing pads 39, carried by the respective bifurcations 15 and 16, bolts 40 being provided, as shown in Figure 5, to secure these bearing pads in position.

The frame 10 of the vehicle carries a bifurcated bracket 41 which is formed with upper and lower arms 42 and 43. These arms carry aligned trunnions 44 which are secured thereto by means of bolts 45 and which engage bearings 46, formed within recesses 47 in the ring 32. The brackets 41 are apertured at 48 to receive the housing 11 and jack shaft 12.

Suitable means may be provided to turn the ring 32 about the axis of the trunnions 44 and thus effect a steering of the vehicle through movement of the wheel 13 about such axis. The universal driving connection afforded by the ball 23 causes such steering movement to take place without defeating the effective drive to the wheel 13.

Figure 6:
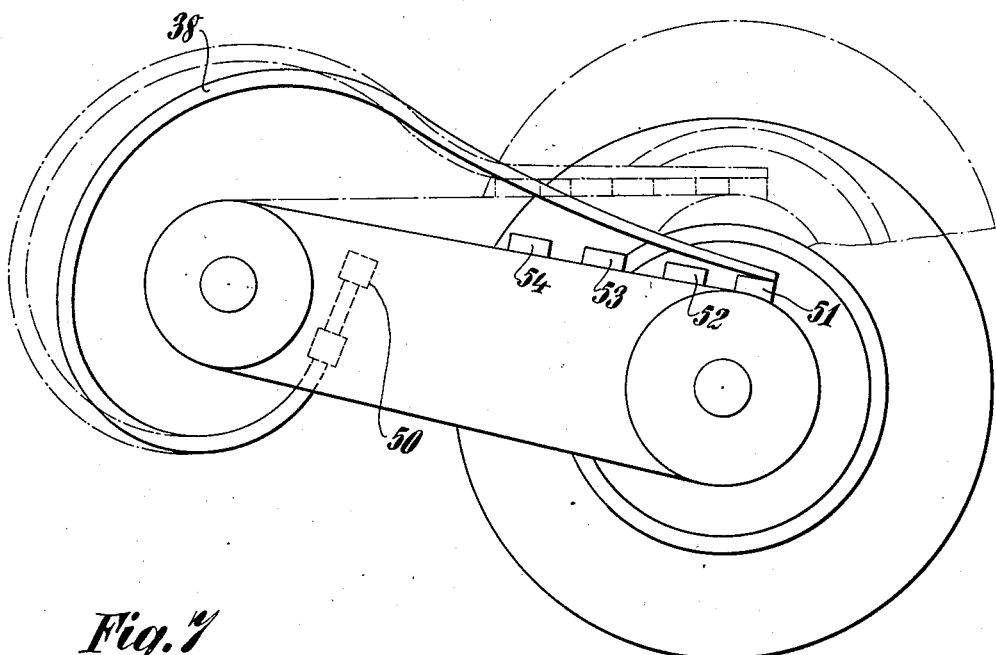
Figure 6 is a schematic view in side elevation showing a modified form of spring mounting for a wheel mounted in accordance with the present invention.
Figure 7:
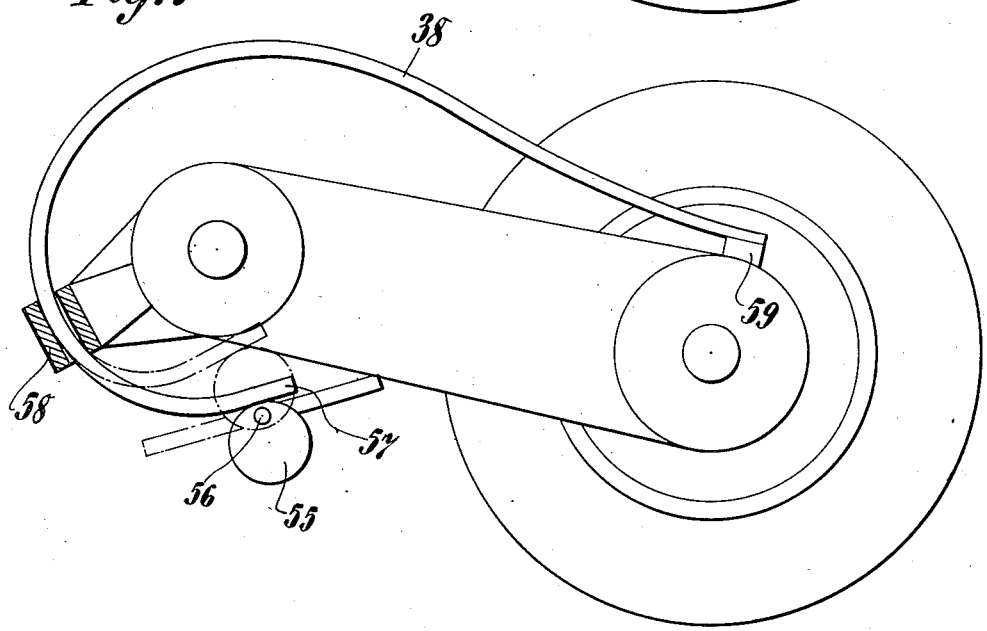
Figure 7 is a view similar to Figure 6, showing a further modification of the invention.

In Figures 6 and 7 modified spring mountings have been shown wherein the spring 38 is anchored upon the ring 32 between the axis of the shaft 12 and the wheel 13. This anchor is indicated at 50 in Figure 6 and the free end of the spring is adapted to engage successive bearing pads 51, 52, 53 and 54, carried by the bifurcations 15 and 16, to shorten the load arm progressively as the load on the spring increases. This affords a stiffer spring under heavy load conditions and improves, materially, the spring suspension.

In Figure 7, a cam 55 is mounted at 56 upon the ring 32 and is adapted to engage the anchor end 57 of spring 38. The spring passes through a sleeve 58 carried by the ring and engages a bearing pad 59 in a manner similar to that described in the construction shown in Figures 2, 3, 4, and 5. The cam 55 is preferably manually adjustable and thus enables the stiffness of the spring to be varied at will.

While the invention has been described with specific reference to the accompanying drawings, it is not to be limited, save as defined in the appended claims.

I claim as my invention:

1. An individual wheel mounting comprising a device for mounting a wheel, means carried by the device for driving the wheel, means mounting the device for movement in a vertical plane, and bearings carried by a vehicle frame for journaling the last named means for movement in planes at right angles to the plane of the wheel.

2. An individual wheel mounting comprising a device for mounting a wheel, means carried by the device for driving the wheel, a ring journaling the device for movement in a vertical plane, trunnions on the ring upon an axis at right angles to the axis of the ring, and means to journal the trunnions on the vehicle frame.

3. An individual wheel mounting comprising a device for mounting a wheel, means carried by the device for driving the wheel, a ring journaling the device for movement in a vertical plane, trunnions on the ring upon an axis at right angles to the axis of the ring, means to journal the trunnions on the vehicle frame and a spring carried by the ring and engaging the device.

4. Means for mounting a vehicle wheel comprising a bifurcated housing, means to journal a wheel between the bifurcations thereof, driving means carried by each bifurcation, means to mount the housing on a vehicle frame for movement in vertical and horizontal planes, a driving shaft extending into the housing, an elongated member driven by the shaft through a universal joint, and means to drive the driving means by the member.

5. Means for mounting a vehicle wheel comprising a bifurcated housing, means to journal a wheel between the bifurcations thereof, driving means carried by each bifurcation, means to mount the housing on a vehicle frame for movement in vertical and horizontal planes, a driving shaft extending into the housing, a sleeve about the shaft, a universal joint between the sleeve and shaft, and means to drive the driving means from the sleeve.

6. Means for mounting a vehicle wheel comprising a bifurcated housing, means to journal a wheel between the bifurcations thereof, driving chains mounted in each bifurcation, means to mount the housing for turning about a horizontal and a vertical axis, a driving shaft coaxial with the horizontal axis of the housing, a sleeve journaled in the housing, means to drive the chains from the sleeve, and a universal driving connection between the shaft and sleeve.

7. Means for mounting a vehicle wheel comprising a bifurcated housing, means to journal a wheel between the bifurcations thereof, driving chains mounted in each bifurcation, means to mount the housing for turning about a horizontal and a vertical axis, a driving shaft coaxial with the horizontal axis of the housing, a sleeve journaled in the housing, means to drive the chains from the sleeve, a ball slidably mounted on the shaft and formed with keys, a ring carried by the sleeve and formed with slots engaged by the keys, and means on the sleeve to adjust the position of the ball.

This specification signed this 24th day of April, A. D. 1931.

ALFRED F. MASURY.